INVENTORS.
SIDNEY LOEB
SRINIVASA SOURIRAJAN
BY Albert Henzie
ATTORNEYS.

United States Patent Office 3,223,424
Patented Dec. 14, 1965

3,223,424
SEAL ASSEMBLY WITH FLUID PRESSURE
RELIEVING MEANS
Sidney Loeb, Los Angeles, Calif., and Srinivasa Sourirajan, Ottawa, Ontario, Canada, assignors to The Regents of the University of California, a corporation of California
Filed Apr. 3, 1962, Ser. No. 184,718
8 Claims. (Cl. 277—23)

This invention relates to a means for improving O-ring seals, particularly so that O-rings may be used successfully with a joint containing a membrane or other material within the gap of the joint.

The invention is particularly adapted to, but not limited to utilization in the sealing of a desalinization membrane or comparable element such as disclosed in the prior application of Sidney Loeb and Srinivasa Sourirajan Serial No. 72,439 filed November 29, 1960, now Patent No. 3,133,132.

O-rings are used extensively ot prevent fluid leakage through joints having different pressure on one side of the joint than the other. The successful use of an O-ring in this service depends largely on designing the joint so that all of the differential pressure is sustained across the O-ring cross section. Under these circumstances, the O-ring tends to extrude into the gap on the low pressure side of the O-ring cross section so that the pressure differential increases the effectiveness of the seal. The gap refers to a space between two parts, usually solid or metal parts being sealed. In this situation, which is quite normal, no problem exists.

It is advantageous to use the O-ring type of seal in a static joint containing a membrane as one component, such that the membrane extends into the gap between parts otherwise being sealed and is contained by the metallic parts or other components on either side of the seal. The membrane may be like that of Patent No. 3,133,132 or may be other than a solid material such as a fibrous or other type of material. Unfortunately the membrane may then act to cause or produce a resistance path of flow, that is, it neither seals off flow completely nor offers unimpeded flow. Because of this resistance path, a large fraction of the total differential pressure is no longer available for extruding the O-ring into the gap, but instead is effective for causing leakage through the aforementioned resistance path. Under these circumstances, the joint will continue to leak. The problem, therefore, is that of enabling the O-ring joint to function in a normal manner, that is, by differential pressure extrusion of the O-ring into the gap when the joint contains a membrane in the gap, the said membrane offering unwanted resistance to flow. The object of this invention is to discern the nature of this problem and to provide a solution therefor, including specific means providing a satisfactory solution.

In a preferred form of the invention as disclosed herein, the problem is solved by also including in the gap a sheet or element providing a channel or channels nullifying the effect of the resistance path described above. The effect is to release pressure from the inside surface of the O-ring allowing it to extrude into the gap. The element may preferably be a sheet of material having a rough surface. The rough surface preferably is such that a communicating network of channels is provided in the sheet. This network prevents the membrane in the gap from offering appreciable resistance to flow through the gap and thus permits all differential pressure to be maintained across the O-ring cross section.

A more specific object of the invention, therefore, may be stated as the provision of an improved sealed joint sealed by an O-ring assembly including therein, an additional element as described, which provides the channel or channels for eliminating the resistance path created by the membrane itself which would otherwise impair the effectiveness of the seal.

A more specific object of the invention is to provide a sealing assembly as in the foregoing object, particularly adapted for sealing joints containing a membrane wherein the additional element provided is in the form of a rough sheet or lamination included in the gap with the membrane and effective to emboss or otherwise produce a channel or channels capable of achieving the result as described of eliminating the said resistance path and relieving pressure from the inside surface of the sealing ring.

The invention may be practiced in various alternative forms, as will be described in detail hereinafter.

Further objects and additional advantages of the invention will become apparent from the following detailed description and annexed drawings wherein.

Figure 1:
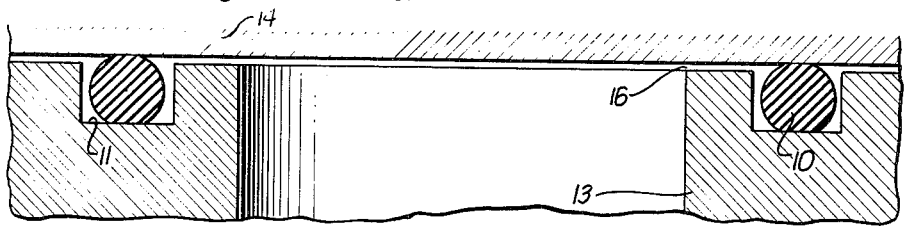
FIGURE 1 is a schematic view of a typical sealed joint sealed by an O-ring.

Referring now more in detail to FIGURE 1 of the drawings, this figure illustrates a typical sealed joint sealed by an O-ring 10. In this particular joint the O-ring 10 is in an annular groove 11 in the end part of a member to be sealed as shown at 13, which might be cylindrical, for example. The O-ring 10 seals against a solid or metal surface 14 there being a gap as shown at 16 between the member 13 and the part 14. FIGURE 1 shows the relationship of the parts with zero pressure differential pressure across the joint.

Figure 2:
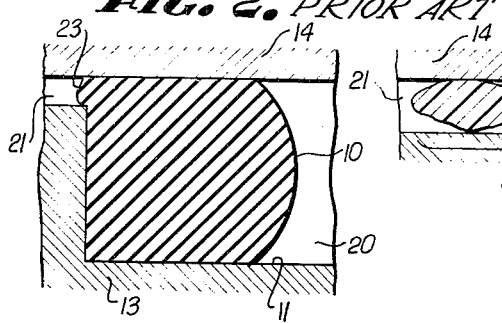
FIGURE 2 is an enlarged view of one side of FIGURE 1 showing the normal action of the O-ring in sealing the gap of the joint.
Figure 3:
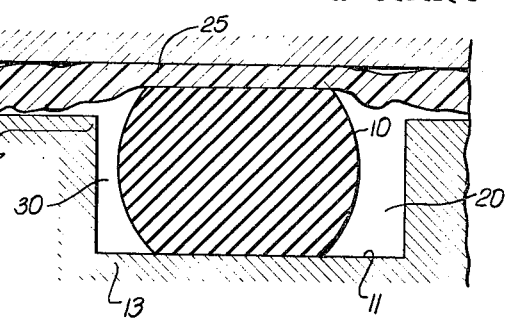
FIGURE 3 is a diagrammatic illustration of a joint as in FIGURE 1 wherein a membrane is included in the joint showing the effect upon the seal.

FIGURE 2 illustrates the action in the typical sealing ring with pressure across the joint. Numeral 20 designates the region of high pressure and numeral 21 designates the region of lower pressure in the gap. In this figure all of the differential pressure across the seal is across the O-ring which causes the O-ring to extrude into the gap, as indicated at 23, producing an effective seal. The differential pressure, as may be observed, increases the effectiveness of the seal. FIGURE 3 illustrates diagrammatically a part of a similar sealed joint sealed by an O-ring where the joint includes a membrane 25, the peripheral parts of which are sealed between the other sealed parts, that is, the part 13 and the part 14. In the illustration shown, the membrane 25 is sealed against a solid, but porous metal member or plate illustrated by the numeral 14. This seal is typical of the sealing of desalinizing membranes as used in the desalinizing assemblies as illustrated in the aforesaid prior application. The membrane might be composed of various materials; it might be a membrane formed of cellulose acetate or comparable materials or it might be another type of membrane or other element which could have a deteriorating effect on the seal as described herein. The membrane in FIGURE 3 extends into the gap, as shown. The effect of the membrane then is or may be that it neither seals off flow completely nor permits unimpeded flow. It acts to cause a resistance path to flow through that part of the membrane in the gap and underneath the membrane so that there is a differential pressure across the distance indicated by the bracket 27. That is, all of the differential pressure is not directly across the O-ring, but a substantial part of it is across that part of the diaphragm embraced by the bracket 27. In other words, there is a pressure in the space designated by the numeral 30 so that the O-ring is not forced into the position of FIGURE 2 and is not extruded into the gap as indicated at 23, with the result that the seal is less than effective and leaks.

Figure 4:
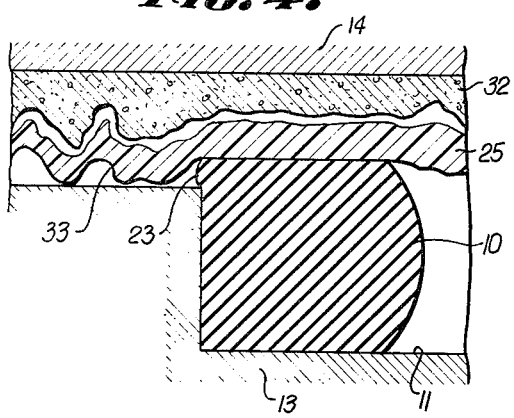
FIGURE 4 is a diagrammatic view similar to that of FIGURE 3 illustrating an adaptation of one form of the herein invention.

FIGURE 4 illustrates a preferred form of the invention herein. As shown, an additional element is used in the seal which is in the form of a sheet of rough material or a lamination 32, which is included in the assembled parts as shown, in a position in this figure between the member 14 and membrane 25. The lower side of sheet 32 is rough and the irregularities are embossed into the membrane 25, as illustrated, to form channels, the embossments forming corresponding channels, as designated at 33 on the lower side of the membrane. The nature of the irregularities may be such as to form embossments and the corresponding channels which provide a communicating network. These channels or network provide a low resistance path of flow in the membrane filled gap and particularly from the region adjacent the part 23 of the O-ring through the gap and to the region of lowest pressure. In other words, the release of pressure from adjacent the part 23 of the O-ring allows this part to extrude into the gap just as it does in FIGURE 2. The effectiveness of the seal is therefore limited only by the extent to which that part of the membrane 25 pressed against the O-ring 10 can act as a seal.

Figure 5:
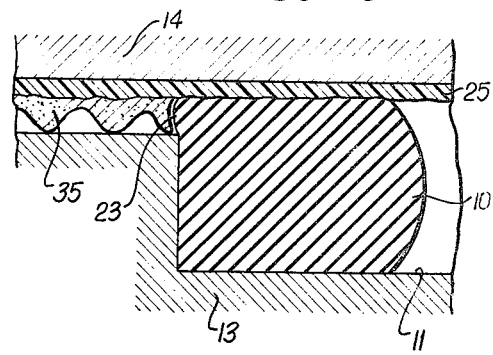
FIGURE 5 is a view similar to that of FIGURE 4 illustrating another alternative of the herein invention.

FIGURE 5 shows a form of the invention wherein the membrane 25 is next to the member 14 with a rough sheet 35 below it. The rough sheet 35 has a network of channels in it similar to that of sheet 35 and additionally the sheet is porous to allow flow through the interior of the sheet by reason of its porosity as well as through the channels on its surface. This contributes further to relieving the pressure adjacent part 23 of the seal 10 to allow this part to extrude into the gap. As materials for the rough sheets, any suitable materials may be used which may include paper or other sheets. As an example of a rough sheet, No. 2 or No. 4, Whatman filter paper has been used with membrane of the type referred to in the foregoing. The invention is particularly adaptable and effective where the member 14 is a member which itself has a smooth surface. The additional element that is, the filter paper, does not then serve simply as a smoothing bed between the membrane and a rough metal member or porous plate, but rather it provides a low resistance flow path as described which would not otherwise be present. It has been found that in such circumstances, that is, where the member 14 had a smooth surface, it was not possible to obtain a seal unless the filter paper was used in the assembly as described. Seals using the invention described herein have been assembled and successfully tested.

Figure 6:
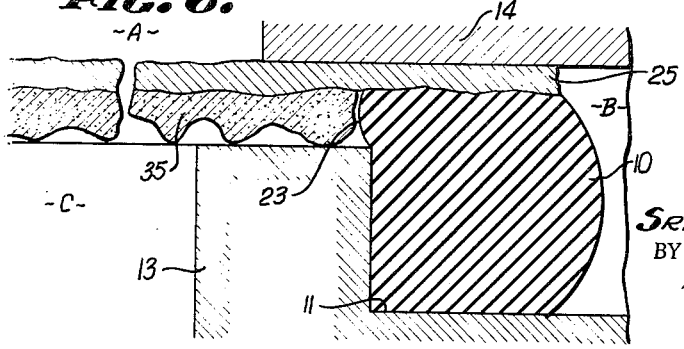
FIGURE 6 is a view similar to that of FIGURES 4 and 5 illustrating another alternative form of the herein invention.

FIGURE 6 shows an adaptation of the invention in a slightly different type of sealing assembly. In this assembly the regions marked "A" and "B" are both high pressure regions being at the same pressure. The region marked "C" is the low pressure region. In other words, the seal is between the regions "B" and "C." The pressure in region "A" tends to compress the membrane 25 and rough sheet 35 against the part 13 thus tending to add to the resistance path through the gap as described above. The invention operates to offset this tendency since it is effective as described in connection with previous modifications in minimizing resistance in the flow path in the gap through the rough sheet 35 and underneath it. As previously described, this allows the part 23 of the sealing ring to extrude into the gap.

With reference to the element described as a rough sheet, this description is intended to be exemplary of any equivalent element. The channels or network of channels may be formed either by irregularities in the sheet or by way of a uniform pattern therein. The pattern may be a knurled or "waffle" pattern. The irregularities or the pattern may be provided in one or both of the metallic components of the joint in the region of the gap as an alternative to the use of a separate element in the form of a rough sheet.

From the foregoing those skilled in the art will observe that the invention as described herein achieves all of the objects as stated in the foregoing and all of the advantages, as well as many additional advantages apparent from the more detailed description. The invention makes possible effective seals and sealing techniques using conventional O-rings in circumstances where there is a membrane or other comparable element to be sealed in addition to the usual or normal solid parts between which there is to be a seal. The invention provides a simplified economical and dependable, but yet highly effective means and offers a technique or method which can be similarly characterized. Effective seals can be achieved in circumstances where otherwise it was practically impossible to achieve an effective seal without resorting to expensive, cumbersome or unwieldy and undesirable means and techniques.

The foregoing disclosure is representative of preferred forms of the invention and is to be interpreted in an illustrative rather than a limiting sense, the invention to be accorded the full scope of the claims appended hereto.

What is claimed is:

1. In an assembly of the type including a compressible sealing element, parts to be sealed including one which is a membrane through which some pressure may pass and having a portion disposed in a gap between adjacent portions of other parts being sealed, one of said other parts having a groove having the said sealing element disposed therein, the improvements comprising an additional membrane assembled in the seal assembly adjacent to the first membrane in the gap and between said other parts, the additional membrane having means disposed in said gap to provide for a low resistance flow path in the said gap whereby to eliminate any substantial pressure differential across the part of the first membrane in the gap on the low pressure side of the sealing element and to thereby relieve pressure from the part of the said sealing element adjacent the said gap on the low pressure side and to allow the said sealing element to extrude into the gap.

2. A seal assembly as in claim 1 wherein the said additional membrane is positioned between one of said other parts and the said first mentioned membrane.

3. A seal assembly as in claim 1 wherein the said additional membrane is in a position between said first membrane and one of said other parts and has at least a portion adjacent to the said sealing element on the low pressure side thereof.

4. A seal assembly as in claim 1 wherein the seal is circular and the compressible sealing element is an O-ring.

5. A seal assembly as in claim 2 wherein the seal is circular and the compressible element is an O-ring.

6. A seal assembly as in claim 3 wherein the seal is circular and the compressible element is an O-ring.

7. In a seal assembly comprising a compressible sealing element and parts to be sealed including one of which is a membrane through which some pressure may migrate, and having a portion disposed in a gap between adjacent portions of other of said parts to be sealed, one of said parts having a groove having said sealing element disposed therein, the improvements comprising means forming a rough surface on one of the said other parts adjacent said portion of the membrane in the gap and adjacent said groove, the said surface being such as to provide channels for communication of pressure so as to substantially eliminate pressure differential through the said portion of the membrane in the gap whereby to allow the said sealing element to extrude into the gap.

8. The seal assembly as in claim 7 wherein the seal is circular and the compressible element is an O-ring.

References Cited by the Examiner

UNITED STATES PATENTS

| 2,353,977 | 7/1944 | Thornhill | 277—165 |
| 2,784,013 | 3/1957 | Groen | 277—165 |
| 2,909,398 | 10/1959 | Taylor | 277—165 |

FOREIGN PATENTS

| 613,114 | 1/1961 | Canada. |

LEWIS J. LENNY, *Primary Examiner.*

SAMUEL ROTHBERG, EDWARD V. BENHAM,
*Examiners.*